Jan. 20, 1970 W. H. MILLER, JR., ET AL 3,490,716

HUB FOR TAPE REELS

Filed March 27, 1968

INVENTORS
WARREN H. MILLER, Jr.
& CLAUDE C. BEATON

BY Hurvitz, Rose & Greene
ATTORNEYS 3,490,716

HUB FOR TAPE REELS

Warren H. Miller, Jr., Indialantic, and Claude C. Beaton, Melbourne, Fla., assignors, by mesne assignments, to Mohawk Data Sciences Corp., Herkimer, N.Y.

Filed Mar. 27, 1968, Ser. No. 716,606
Int. Cl. B65h *17/02*
U.S. Cl. 242—68.3 6 Claims

ABSTRACT OF THE DISCLOSURE

A hub for tape reels has an inner member secured to a drive shaft and a hollow outer member secured to but axially slidable relative to the inner member. A reel is placed over the outer member and pushed rearwardly carrying the outer member with it. T-shaped pins disposed about the outer member engage an inclined surface of the inner member and are cammed outwardly pressing an O-ring into engagement with the inner periphery of the reel. An over-center spring holds the outer member in the rearward position. An outward pull on the reel or outer member reverses the action and releases the reel.

The invention is primarily concerned with the field of digital data handling and with a hub for the speedy application and removal of a tape reel requiring the use of only a single hand of the operator. In most prior art tape reels of the type with which the present invention is concerned, it is necessary for an operator to place the tape reel on a hub with one hand and manipulate a locking device with the other hand. This operation is relatively slow and requires the operator to employ both hands which is often inconvenient.

In accordance with the present invention, there is provided a hub for tape reels which locks the reel in place by a relatively small rearward pressure of the reel on the hub. Specifically, the hub is made in two parts and has an inner hub part or member secured to the drive shaft of the tape feed or take-up mechanism and an outer hub member secured to the inner hub member but axially slidable relative thereto. The outer hub member is generally a hollow cylinder having one end closed and an open end which is disposed about the inner hub member. The outer hub member has a circumferential groove in the bottom of which is located a plurality of headed or T-shaped pins with the heads sitting in the bottom of the groove and the body parts extending through holes in the outer member into the interior hollow region of the outer member. The pins are retained in position by means of an elastic O-ring which, when the heads of the pins are seated against the bottom of the groove, is located just inwardly of the outer periphery of the outer hollow hub member.

The inner hub member is provided at its outer axial end with an over-center spring which engages a groove of the interior surface of the outer hub member. The inner hub member is provided with an inclined surface extending axially of the hub and is engaged by the inner ends of the pins secured in the outer hub member.

When the outer hub member is in its forwardmost position, the pins engage the smallest diameter portion of the inclined surface and the heads of the pins are seated against the bottom of the groove. When a reel is placed on the outer hub member and pushed rearwardly, the reel initially engages a flange on the outer hub member and carries the outer hub member with the reel. The pins move along the inclined surface of the inner hub member and are cammed outwardly in the process. The heads of the pins push against the elastic O-ring which now engages the inner surface of the reel and tightly grips the reel. When the reel has been pushed rearwardly far enough, the over-center spring is operated and holds the hub in this position for rotation with the hub assembly.

When it is wished to disengage the reel from the hub, the reel is pulled outwardly, and the over-center spring snaps over pushing the outer reel away from the inner hub member. The pins travel down the inclined plane and the O-ring retracts thereby releasing the reel.

It can be seen from the above that only a single hand is required since the reel can be placed on the hub and pushed toward the rear or pulled forwardly with just the one hand of the operator being required. The operation is rapid and the gripping action is very solid, there being substantially no slippage detectable during start-up or stopping of the hub. In this respect, it should be noted that the over-center spring prevents rotation between the inner and outer hub members.

It is an object of the present invention to provide a hub assembly for tape reels which assembly locks a reel to the hub by simply pushing rearwardly on the reel once it is placed on the hub.

It is another object of the present invention to provide a hub assembly for tape reels which assembly is simple in construction comprising only two major parts plus a few pins, an O-ring and an over-center spring and which hub assembly is easily operated.

It is still another object of the present invention to provide a two-part locking hub for tape reels which hub is simple and inexpensive to manufacture but which provides positive locking of the reel on the hub.

The above and still further objects, features and advantages of the present invention will become apparent upon consideration of the following detailed description of one specific embodiment thereof, especially when taken in conjunction with the accompanying drawings, wherein.

Figure 1:
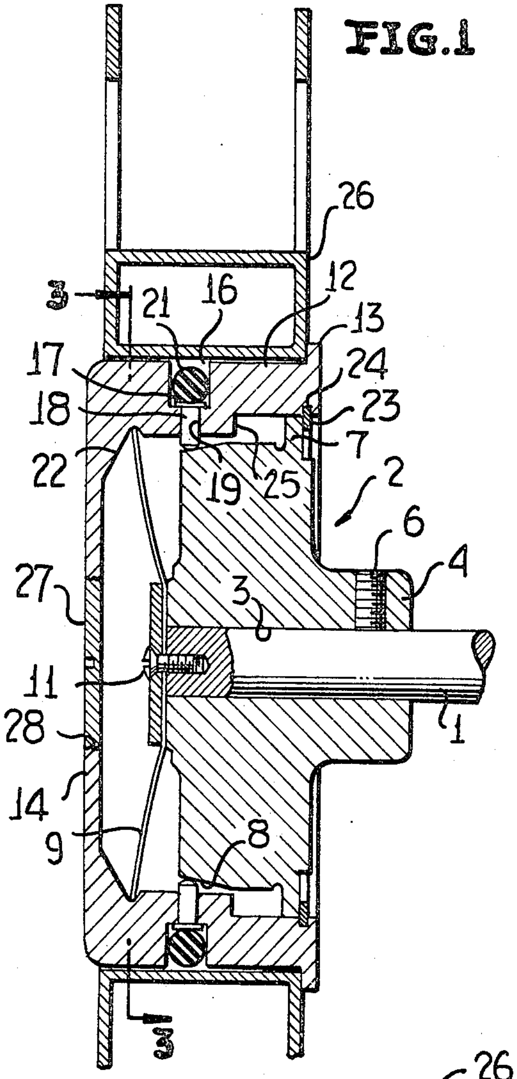
FIGURE 1 is a side view in cross-section of the inner and outer hub assembly in its reel unlocking position.

Referring now specifically to FIGURE 1 of the accompanying drawings, there is provided a drive shaft 1 to which is secured an inner hub member generally designated by the reference numeral 2. The principal parts of the inner hub member 2 are a center bore 3 which receives the shaft 1, an annular region of reduced diameter 4 which receives a set screw 6 for securing the inner hub member 2 to the shaft 1, a circular outwardly extending flange 7 for purposes to be described subsequently and an inclined circumferential surface 8 for purposes of camming a plurality of pins to be described subsequently.

Secured to the front or left end of the hub member 2 in FIGURE 1 of the accompanying drawings is an over-center leaf spring 9, the spring actually being secured in this figure to the shaft 1 by means of screw and washer arrangement designated by the reference numeral 11.

There is further provided with an outer hub member 12 having a rearward outwardly extending flange 13 secured to the rear or right side of the outer member as viewed in FIGURE 1. The outer member 12 is hollow and has a front end wall 14 defining one end of the hollow region. The member 12 is provided with a circumferential recess 16 against the bottom surface of which rests heads 17 of the plurality of pins 18. The pins 18 extend through radially extending holes 19 in the member 12, the holes 19 being spaced at equal angles about the circumference of the bottom of the groove 16. In the typical example, pins 18 may be located every sixty degrees about the periphery of the groove 16 although smaller or larger spacings may be employed as required by the operating characteristics of a system.

The pins are retained in the groove by means of an elastic O-ring 21 which, when the pins are in their fully depressed position or radially inward position as illustrated in FIGURE 1, lies just below or even with the level of the outer circumferential surface of the member 12. The bottoms of the pins 18 rest against the smallest diameter portion of the inclined surface 8 of the inner hub member 2 when the apparatus is in the position illustrated in FIGURE 1; that is, in the reel unlocking position of the device. The over-center spring 9 is received in a recessed groove 22 formed in the inner periphery of the outer member 12. A retaining ring 23 is seated in a groove 24 on the inner periphery of the outer hub member 12 and is positioned behind the annular flange or shoulder 7 of the inner hub member 2. The cooperation of the retaining ring 23 and flange 7 restrains forward movement of the outer hub member.

Figure 2:
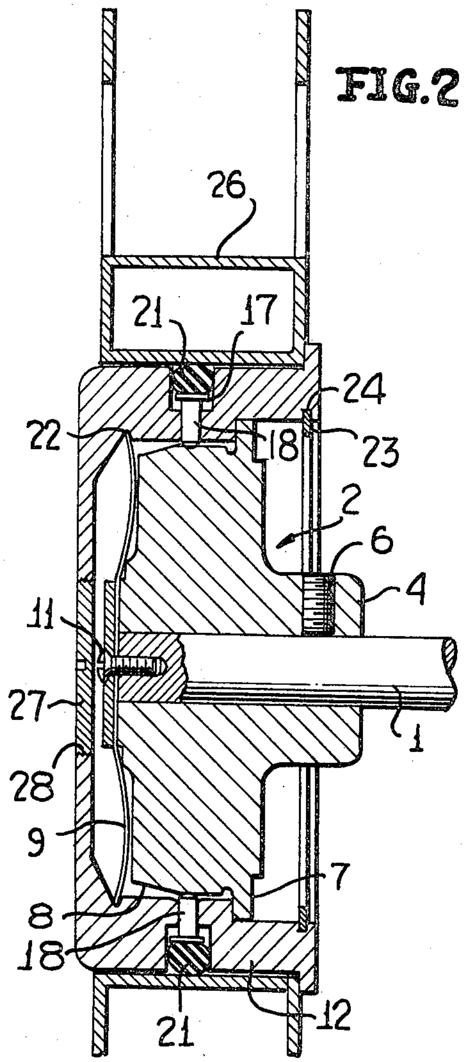
FIGURE 2 is a cross-sectional view in elevation of the hub assembly of the present invention showing the position for locking a reel in place.

In operation, a reel, which is generally designated by the reference number 26, is placed over the outer hub member and pushed rearwardly until the reel engages the upstanding flange 13. Continued rearward movement, i.e. left-to-right movement of the reel 26 now causes the outer hub member 12 to travel in the same direction and the pins 18 travel up the inclined surface 8 pressing the O-ring 21 against the inner periphery of the reel 26. After the outer hub member has traveled approximately three-quarters of its maximum travel distance, the spring 9 is forced overcenter so that the spring now presses the outer hub member 12 toward the rear, i.e. to the right as illustrated in FIGURE 1. The outer hub member 12 now continues to travel to the right under the force of the spring 9 until the shoulder 7 engages a radial annular surface 25 of the outer hub member 26 which is formed by a deep circumferential groove cut into the inner surface of the outer hub member 12. This condition is illustrated in FIGURE 2 of the accompanying drawings which is the fully locked position of the hub assembly. It will be noted that the O-ring 21 is now deformed due to being depressed between the inner surface of the reel 26 and the heads 17 of the pins 18. It will be also noted at this point that the bottom surface of the pins 18 are on a flat part of the hub 2 immediately behind, i.e. to the right, of the inclined surface 8.

As an example of a practical device, an inner hub is provided having the outer diameter of the flange 7 about 2.50 inches, an inclined surface which has a smallest diameter of 2.025 inches and a maximum diameter of approximately 2.125 inches with the hub being approximately 1.35 inches in axial length. The outer diameter of the other member is approximately 3.00 inches, its innermost diameter is about 2.15 inches and the outer diameter of the flange 13 is 3.25 inches. The diameter of the bottom surface of the groove 16 is about 2.50 inches. The axial travel of the outer hub member is approximately 5/16 of an inch with approximately 1/8 inch of travel of the outer hub from the position illustrated in FIGURE 2 toward the position illustrated in FIGURE 1 required for the spring 9 to move over center. Thus, the last 3/16 of an inch of travel of the outer hub in the release direction is primarily effected by the over-center spring 9 which actually throws the outer hub member away from the inner hub and thus tends to push the reel off and into the hand of the user.

It should be noted that in high precision reels where it may be undesirable to actually use the reel to pull out on the outer hub member, a knob may be placed as illustrated in FIGURE 2 on the outer surface of the wall 14 of the outer hub member 12. The hub may be formed as part of a plate 27 which can be screwed into the wall 14 or into a hole 28 formed in the wall 14 which hole may be employed to pass the washer-screw assembly 11 into the mechanism to secure the spring 9 to the hub 2 after the apparatus has been assembled.

Figure 3:
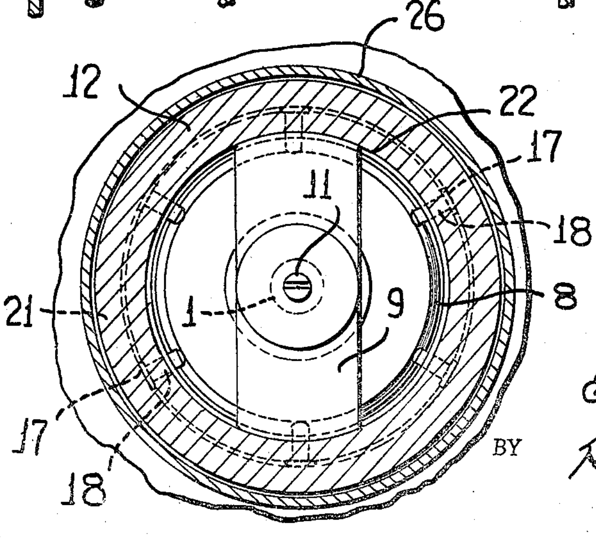
FIGURE 3 is a front view of the inner hub member of the present invention taken along section line 3—3 of FIG. 1.

Referring specifically to FIGURE 3 of the accompanying drawings, there is illustrated a front view of the outer hub member 12 which illustrates the position of the holes 16 through which the pins 18 extend. Also illustrated is the leaf or over-center spring 9 which is shown to be a generally elongated rectangular member having curved ends to seat in the circumferential groove 22.

We claim:

1. A hub assembly for tape reels comprising a rotable inner hub member and a hollow outer hub member having a wall defining a generally cylindrical outer surface, said hollow outer hub member being disposed above, rotatable with and axially slidable between a first position and a second position relative to said inner hub member, said outer surface having a circumferential groove formed therein, an elastic member disposed in said groove and having a maximum diameter approximately the same as said outer surface when said hub is in said first position, means for expanding said elastic member upon movement of said outer hub member from said first to said second position, and means extending between said hub members for maintaining said outer hub member in said first position and in said second position, respectively.

2. The combination according to claim 1 wherein said means for maintaining is an over-center spring.

3. The combination according to claim 1 wherein said means for expanding comprises a plurality of pins extending between said groove and the interior of said outer hub member through said wall thereof and means for moving said pins outwardly upon movement of said outer hub from said first to said second position.

4. The combination according to claim 3 wherein said means for moving comprises a generally conical surface formed on said inner hub member, said hub members being so positioned and arranged that said pins contact said inner hub and are moved from a smaller diameter region to a larger diameter region of said inner hub along said conical surface upon movement of said outer hub member from said first to said second position.

5. The combination according to claim 4 further comprising means for maintaining said outer hub member in said first position and in said second position respectively.

6. The combination according to claim 3 wherein said means for moving comprises a surface formed on said inner hub member, said hub members being so positioned and arranged that said pins contact said inner hub and are moved from a smaller diameter region to a larger diameter region of said surface upon movement of said outer hub member from said first to said second position.

References Cited

UNITED STATES PATENTS

| | | | |
|---|---|---|---|
| 3,249,314 | 5/1966 | Kjos | 242—68.3 |
| 3,272,452 | 9/1966 | Cohen | 242—68.3 |
| 3,366,343 | 1/1968 | Messamer et al. | 242—68.3 |
| 3,379,388 | 4/1968 | Gruczelak | 242—68.3 |

NATHAN L. MINTZ, Primary Examiner